March 16, 1943. B. C. HALL 2,314,209
LEVEL
Filed Jan. 16, 1942
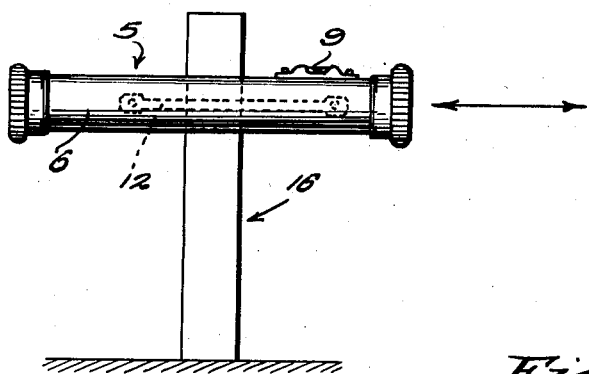
Fig. 1
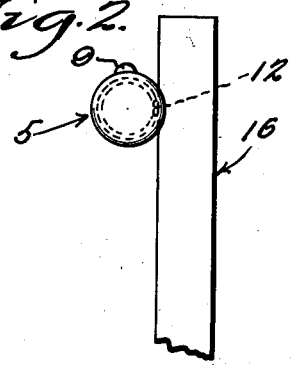
Fig. 2
Fig. 5.
Fig. 4
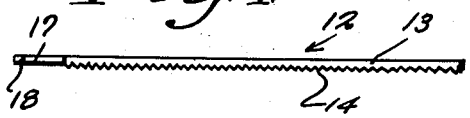
Fig. 3
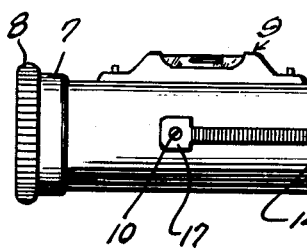
Inventor
Burton C. Hall
By Clarence A. O'Brien
and Harvey B. Jacobson, Attorney Patented Mar. 16, 1943

2,314,209

UNITED STATES PATENT OFFICE 2,314,209

LEVEL

Burton C. Hall, Mansfield, Conn.

Application January 16, 1942, Serial No. 427,060

1 Claim. (Cl. 33—207)

The invention relates to improvements in levels such as are used in road construction work for obtaining the proper grade and marking the grade for the guidance of the construction crew, and the primary object of the invention is to provide such a level with a marking blade to be moved against the marking stakes which are usually driven into the ground at intervals, to correctly mark such stakes, and thereby eliminate the present necessity for the engineer to assume an awkward position and to hold the level with one hand while marking the stake with chalk with the other hand.

Another important object of the invention is to provide stake marking means in a level, the application of which to the level involves a minimum of mechanical derangement of the level and which provides no objectionable projections which would interfere with the acceptance of the level in the usual case provided therewith.

Other important objects and advantages of the invention will be apparent from a reading of the following description taken in connection with the appended drawing, wherein for purposes of illustration I have shown a preferred embodiment of the invention.

In the drawing:

Figure 1 is a general side elevational view showing application of the marking blade on the improved level to a marking stake.

Figure 2 is a fragmentary right hand end elevational view of Figure 1.

Figure 3 is an enlarged side elevational view of the level showing the marking blade attached thereto.

Figure 4 is a fragmentary top plan view of the marking blade.

Figure 5 is a fragmentary side elevational view of the stake as marked in accordance with the present invention.

Referring in detail to the drawing, the numeral 5 generally designates a conventional hand level of the character herein indicated, which may involve a cylindrical casing 6 having diametrically expanded ends 7 with still further diametrically enlarged knurled portions 8. The bubble level per se which is generally designated 9 is longitudinally arranged on the cylinder 6 adjacent one end thereof as indicated in the drawing. On such conventional levels there are two longitudinally spaced screws 10 and 11, respectively, whose function is to hold the inside level (not shown) with which such devices are provided. In accordance with the present invention these same screws may be utilized to hold and position the marking blade which is generally designated 12 and comprises an elongated parallel sided rod 13 provided on its outer face with sharp serrations 14 and suitable to form a marking groove or grade 15 on a grade marking stake 16, to itself act as the grade mark or to indicate the place where the stake is to be subsequently marked with chalk to indicate the grade. The opposite ends of the rod 13 have enlarged generally rectangular plate-like portions 17 formed with holes 18 to receive the screws 10 and 11, whereby the blade is attached longitudinally along the side of the cylinder 6 as indicated in Figure 3 of the drawing. The marking blade 12 is positioned substantially at 90 degrees around the cylinder from the outside upper level 9.

Other means of attachment for the marking blade 12 may be provided within the concept of the invention which preserve the general relationships described and enable the level 5 to be held in the hand after the leveling operation and the blade 12 applied to the stake 16 with a back and forth horizontal motion as indicated by the arrows in Figure 1 of the drawing, so as to cut or scratch the mark 15 on the stake. The serrations or teeth 14 on the marking blade will be constructed so as to be suitable to mark the stakes whether of wood or of iron or some other material.

Although there is shown and described herein a preferred embodiment of the invention it is to be understood that it is not desired to limit the application of the invention thereto except as may be required by the scope of the subjoined claim.

Having described the invention, what is claimed as new is:

A level comprising a casing having a longitudinally arranged bubble level on its upper side, and a longitudinally arranged blade fixed on a side thereof for producing a grade mark on a stake by reciprocating the casing with the blade in contact with the stake and with the bubble in said bubble level equalized, said marking blade comprising a rod, means securing the opposite ends of said rod to the casing, and serrations on the exposed side of said rod.

BURTON C. HALL.